US009887505B2

(12) United States Patent
Favie et al.

(10) Patent No.: US 9,887,505 B2
(45) Date of Patent: Feb. 6, 2018

(54) DEVICE FOR GUIDING A SURFACE LINK CABLE FOR A SUBMERGED ROBOT

(71) Applicant: ZODIAC POOL CARE EUROPE, Paris (FR)

(72) Inventors: Louis Favie, Colomiers (FR); Remi Deloche, Toulouse (FR)

(73) Assignee: ZODIAC POOL CARE EUROPE, Paris (FR)

( * ) Notice: Subject to any disclaimer, the term of this patent is extended or adjusted under 35 U.S.C. 154(b) by 0 days.

(21) Appl. No.: 15/320,976

(22) PCT Filed: Oct. 23, 2015

(86) PCT No.: PCT/EP2015/074685
§ 371 (c)(1),
(2) Date: Dec. 21, 2016

(87) PCT Pub. No.: WO2016/062890
PCT Pub. Date: Apr. 28, 2016

(65) Prior Publication Data
US 2017/0222385 A1 Aug. 3, 2017

(30) Foreign Application Priority Data

Oct. 23, 2014 (FR) ..................... 14 60188

(51) Int. Cl.
*B63B 22/00* (2006.01)
*E04H 4/16* (2006.01)
(Continued)

(52) U.S. Cl.
CPC ............ *H01R 33/90* (2013.01); *B63B 22/00* (2013.01); *E04H 4/1672* (2013.01); *H01R 39/64* (2013.01); *H02G 9/12* (2013.01); *E04H 4/1654* (2013.01)

(58) Field of Classification Search
CPC ......... B63B 22/00; B63B 35/32; B63B 59/06; E04H 4/1654; E04H 4/1663;
(Continued)

(56) References Cited

U.S. PATENT DOCUMENTS 6,448,494 B1 * 9/2002 Erlich ................... E04H 4/1654
174/10
6,645,375 B2 * 11/2003 Henkin ................. E04H 4/1672
134/168 R (Continued)

FOREIGN PATENT DOCUMENTS

AU   2008202422   6/2008
EP   1022411      7/2000
(Continued)

OTHER PUBLICATIONS

International Patent Application No. PCT/EP2015/074685, Iternational Search Report and Written Opinion, dated Mar. 8, 2016, 11 pages.

*Primary Examiner* — Ajay Vasudeva
(74) *Attorney, Agent, or Firm* — Dean W. Russell; Kilpatrick Townsend & Stockton LLP

(57) ABSTRACT

Detailed is a device for guiding a cable for linking a submerged robot, in particular a robot for cleaning swimming pools, to the device for controlling and powering same, said guiding device including: a. a coupling including a rotary connector, connected by one side to a first floating portion of the linking cable extending from the control and power device to said coupling and, by the other side, to a second portion of the linking cable extending from said coupling to the submerged robot; b. a floating mounting including: b(i). a float; b(ii). an interface for mechanically linking the rotary connector to said float; and b(iii). a hood extending above the surface when the floating mounting is submerged in a liquid and removably connected to the float;

(Continued)

c. in which the mechanical link between the float and the rotary coupling is a ball-and-socket link.

9 Claims, 2 Drawing Sheets

(51) Int. Cl.
*H02G 9/12* (2006.01)
*H01R 33/90* (2006.01)
*H01R 39/64* (2006.01)

(58) Field of Classification Search
CPC ..... E04H 4/1672; E04H 4/1681; E04H 4/169; H01B 7/12; H02G 9/12; H01R 33/90; H01R 39/64
USPC .................. 15/1.7; 439/13; 441/1, 133, 136
See application file for complete search history.

(56) References Cited

U.S. PATENT DOCUMENTS

| | | | |
|---|---|---|---|
| 7,247,069 B2 * | 7/2007 | Porat | B63B 22/24 441/1 |
| 2002/0166804 A1 | 11/2002 | Henkin et al. | |
| 2014/0273541 A1 * | 9/2014 | Renaud | H01R 39/64 439/13 |

FOREIGN PATENT DOCUMENTS

| | | |
|---|---|---|
| EP | 1207594 | 5/2002 |
| FR | 2870281 | 11/2005 |
| WO | 2016062957 | 4/2016 |

* cited by examiner

DEVICE FOR GUIDING A SURFACE LINK CABLE FOR A SUBMERGED ROBOT

CROSS-REFERENCE TO RELATED APPLICATIONS

This is a U.S. national phase under 35 U.S.C. 371 of International Patent Application No. PCT/EP2015/074685, titled "Dispositif de Guidage D'Un Cable de Liaison a la Surface Pour un Robot Immerge" and filed Oct. 23, 2015, which claims priority to French Patent Application No. 1460188, titled "Cable D'Alimentation Pour un Robot de Nettoyage de Piscine" and filed Oct. 23, 2014, the entirety of each of which is incorporated herein by reference.

TECHNICAL FIELD

The field of the invention is the field of accessories for swimming pools. To be more precise, the invention concerns a cable connecting device for the supply of electrical power to and the control of a submerged robot, notably a robot for cleaning a swimming pool.

PRIOR ART

A pool, notably a leisure swimming pool, is commonly cleaned by a robot. According to one embodiment, a robot of this kind includes driving means and steering means enabling it to be moved and to be steered when submerged in water or along the walls of the pool, together with cleaning means, such as suction means or brushing and sweeping means, also driven by drive means supported by said robot, and the operation of which is controlled as a function of the nature of the cleaning operation to be carried out. A control device that is programmable or controlled by a user makes it possible to have the robot carry out cleaning sequences. The robot advantageously includes sensors enabling it, in return, to transmit information to the control device regarding its environment or its operation. Accordingly, during a cleaning sequence, said robot is submerged and moves throughout the volume of the pool whereas its control device is external and not submerged. In order to exchange information with the control device or to be supplied with power, the robot is connected to the outside of the swimming pool, notably to its control and power supply device, by a cable termed the connecting cable. According to embodiments, said cable includes different connections, for example a connection for transporting energy such as an electrical power supply and a connection for exchanging data via a conductive wire or an optical fiber, although these examples are neither limiting on the invention nor exhaustive.

The robot is steered to clean the surfaces of the pool such as the bottom of the swimming pool and its lateral surfaces and therefore carries out numerous movements in the pool.

The numerous movements of the robot include rotation of the robot on itself and circular trajectories that cause tangling and twisting of the connecting cable.

These loads on the connecting cable accelerate its wear, reduce the volume of movement of the robot in the pool and cause interruptions in the cleaning sequence and the necessity for an operator to intervene in order to untangle the cable. In fact, using a prior art device leads on average to between three and five tanglings during a period of operation of the swimming pool cleaning robot of approximately three hours. A tangle is a twisted loop of the connecting cable.

Because of these disadvantages, these prior art robots are not suitable for executing a cleaning sequence if the pool is covered by a flexible pool cover, which is standard practice for a leisure swimming pool when it is not being used, i.e. during periods that are particularly advantageous for cleaning it. In fact, the robot cannot then be seen by the operator, who is not in a position to detect any problem of tangling of the cable.

The document US 2014/0253541 describes a device for guiding an electrical power supply cable of a swimming pool robot, which guide device includes two swivels one of which is fixed to a floating skimmer. This prior art device does not prevent the cable extending between the skimmer and the robot from passing under the power supply cable and therefore causing tangling.

The document US 202/0166804 describes an electrical power supply cable for a swimming pool robot provided with a plurality of buoys so that regardless of the position of the robot in the swimming pool said cable remains in suspension and does not interfere with the movements of the robot. Because of the presence of the buoys, this embodiment cannot be used on a covered pool.

SUMMARY OF THE INVENTION

The invention aims to remove the disadvantages of the prior art and to this end concerns a device for guiding a cable for connecting a submerged robot, in particular a robot for cleaning swimming pools, to the device for controlling and powering it, which guiding device includes:
 a. a coupling including a rotary connector connected by one side to a first floating portion of the connecting cable extending from the control and power supply device to said coupling and by the other side to a second portion of the connecting cable extending from said coupling to the submerged robot, which connector allows relative movement in rotation of the two cable portions about their longitudinal axis;
 b. a floating support including:
  bi. a float;
  bii. an interface for mechanically connecting the rotary connector to said float; and
  biii. a hood extending above the surface when the floating support is immersed in a liquid and removably connected to the float;
 c. in which the mechanical connection between the float and the rotary coupling is a ball-and-socket connection.

The floating support therefore makes it possible to guide the cable between the surface and the depth and cooperates with the rotary connector allowing three degrees of freedom in rotation between the two connecting cable portions so that said cable is routed substantially parallel to the surface of the swimming pool between the control and power supply device and substantially vertically between the rotary connector and the robot.

The invention is advantageously implemented according to the embodiments described hereinafter, considered individually or in any technically operative combination.

The hood is advantageously a smooth and convex dome. Said shape of said hood allows easy sliding of the floating support under a pool cover.

The float is advantageously substantially cylindrical, the axis of said cylinder being substantially perpendicular to the flotation plane, the mechanical connection being situated on the axis and on the opposite side to the hood, the float having an increased diameter in the direction of the hood. Thus if the traction exerted on the mechanical connection has a non-vertical component the float tends to move horizontally on the water. The vertical component of this traction tends to pull the float down in the water in a symmetrical manner with respect to the axis of the cylinder. The increase in the diameter at the waterline at the connection between the float and the hood offers increased resistance to submersion so that the first cable portion is not able to pass over the float and cause tangling.

The profile of the float advantageously follows a diabolo shape. This shape makes it possible both to increase the buoyancy upthrust when the float tends to be pushed down in the water and to offer less hydrodynamic resistance to the horizontal movement of said float.

According to another embodiment, the hood includes a projecting pillar made of a buoyant material. This embodiment is suitable for using the robot in a pool that is not covered. Said pillar increases the buoyancy of the float when the latter tends to be pushed down by the effect of a vertical traction and also prevents the first cable portion from passing over the float.

The float advantageously includes means for removably connecting the hood. The same device is therefore suitable for use in a covered pool or an uncovered pool.

According to one advantageous embodiment, the device according to the invention includes:
  d. a second rotary connector between the float and the first cable portion, said rotary connector allowing one degree of freedom in rotation about an axis perpendicular to the axis of the cylinder.

The movement of the float therefore does not generate twisting effects in the first cable portion.

The device according to the invention advantageously includes:
  e. means for increasing the resistance to twisting of the second cable portion.

The mechanical connection of the rotary connector with the float is advantageously provided by a ball-and-socket with a finger that is prevented from rotating about the axis of the cylinder. This prevents the float from being drawn under the first cable portion by the second cable portion.

DESCRIPTION OF THE FIGURES

The invention is explained hereinafter according to preferred nonlimiting embodiments and with reference to FIGS. 1 to 3, in which:

Referring to FIG. 1, the device according to one embodiment of the invention allows connection of a first submerged robot connecting cable portion (110) and a second cable portion (120). The first cable portion (110) is buoyant and extends substantially parallel to the surface (190) of the liquid between the control and power supply device (not shown) of the robot and floatation means (100) and the second connecting cable portion (120) extends substantially vertically between said flotation means (100) and the robot (not shown). The robot is for example a swimming pool cleaning robot.

Figure 1:
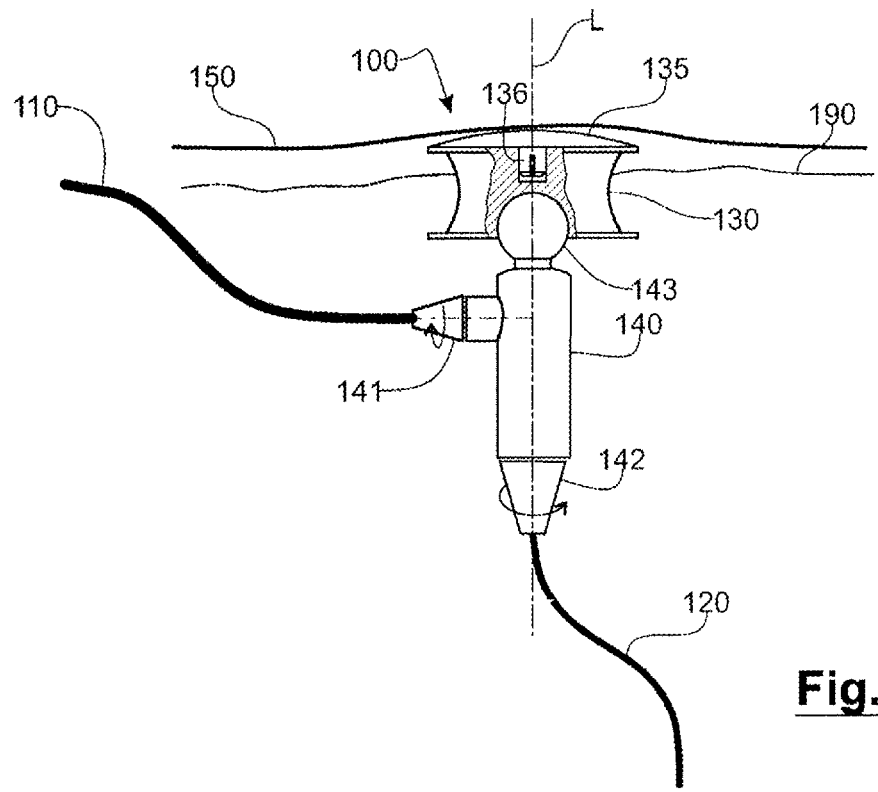
FIG. 1 is a diagrammatic front view in partial section of one embodiment of the device according to the invention suitable for use under a pool cover.

According to this embodiment in which the swimming pool has a depth of 3 m, the first portion (110) of the connecting cable has a length between 10 m and 15 m inclusive and the second portion (120) of the connecting cable has a length of 3.5 m. To prevent any twisting the resistance to twisting of the second connecting cable portion is increased by a helical sheath enabling it to retain some flexibility in bending, for example.

According to this embodiment, the pool is covered by a pool cover (150). The flotation device (100) includes a float (130) of cylindrical shape about an axis (L) substantially perpendicular to the surface (190) of the liquid when said float (130) is immersed therein. Said float is made for example of expanded polystyrene with a density between 15 km/m$^3$ and 25 kg/m$^3$ inclusive. The top part of the float includes a hood of convex dome shape (135) in this embodiment that is removably fixed to said float (130), for example by clipping means (136). Said convex dome is smooth and advantageously made of or coated with a material having a low coefficient of friction relative to the material of the pool cover (150). The shape of the float (130) is designed so that its diameter increases toward its top part, out of the water, receiving said hood, so that the buoyancy section and the displaced volume increase if said float is pulled down. The float therefore tends to stabilize in a floating position with the axis (L) substantially vertical. Increasing the buoyancy area increases the return force on the float (130) relative to the pitch and roll axes perpendicular to the axis (L) and therefore tends to maintain the float in a vertical position. The float (130) is advantageously of diabolo shape, which makes it possible to benefit from the effect explained above whilst reducing the displacement of water of the float in motion compared to a straight-sided cylindrical float.

According to this embodiment, the connecting cable portions (110, 120) are connected to the float by connectors (141, 142) turning about perpendicular axes. These rotary connectors provide continuity of transmission of power and information between the two connecting cable portions (110, 120).

According to an alternative embodiment, only the second cable portion (120) is connected to the float by a rotary connector (142).

Said rotary connectors are connected to the float (130) by means of a support part (140) that is connected to the float (130) by a ball-and-socket (143) on the axis (L) of the cylinder.

Accordingly, in the vicinity of the float, the first cable portion is held substantially parallel to the surface of the water while the second cable portion extends substantially perpendicularly to it. The cooperation of the flotation means and the rotary connectors makes it possible to preserve this configuration regardless of the position of the robot in the swimming pool and regardless of the tension exerted by either cable. The pool cover cooperates with the dome and the float, the dome buoyancy and the weight of the pool cover in contact with the latter being so that the first cable portion cannot pass over the float (130).

Figure 2:
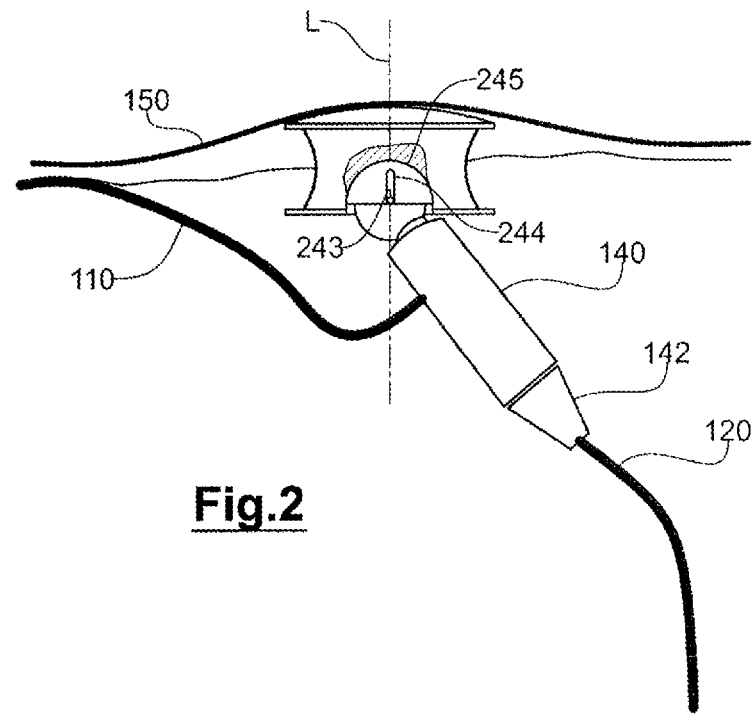
FIG. 2 represents the same view as FIG. 1 of another embodiment of the device according to the invention including a mechanical connection to the rotary connector by means of a ball-and-socket with a finger.

Referring to FIG. 2, according to another embodiment only the second connecting cable portion (120) is connected to the float by a rotary connector (142).

According to one embodiment, not exclusive of this embodiment, the degree of freedom of the ball-and-socket connection between the support part (140) and the float (130) is limited by a finger (243) entering a groove (244) of the dome (245) of articulation of the ball-and-socket. Said finger (243) prevents the ball-and-socket from turning about the axis (L) of the cylinder. Accordingly, rotation of the robot about an axis substantially parallel to this axis when it is not vertically below the float entrains said float and the first floating portion of the connecting cable so that the second cable portion is not able to pass under said first portion, thus preventing the risk of tangling of the two cable portions.

Figure 3:
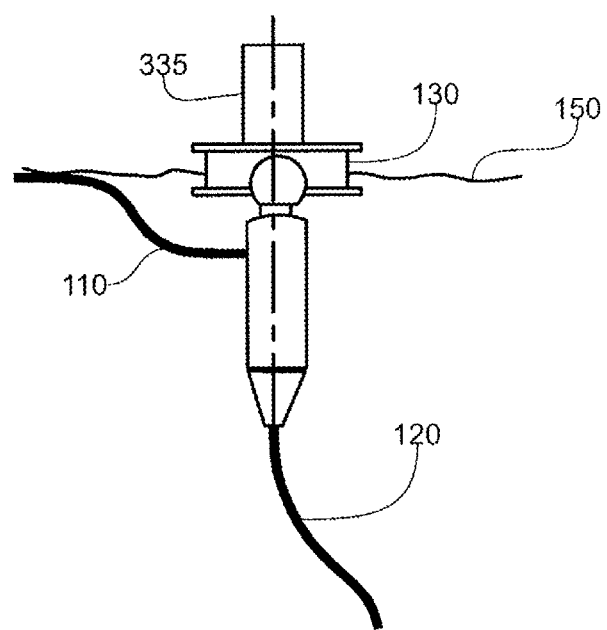
FIG. 3 shows the same view as the previous figures of one example of the use of the device according to the invention in a configuration suitable for use in a pool that is not covered.

Referring to FIG. 3, according to another embodiment of the device according to the invention, suitable for use in a pool that is not covered, the hood (335) consists of a pillar. According to one embodiment, said pillar is a hollow tube 4 cm in diameter and 12 cm high made of expanded polystyrene, for example. Said pillar is connected to the float (130) by the same clipping means as are used for the convex dome. This pillar (335) makes it possible to push away the first connecting cable portion (110) even if the traction exerted by the second cable portion (120) tends to sink the float, with the result that the first cable portion cannot pass under the float even in the absence of the effect of a pool cover.

The above description shows clearly that by virtue of its various features and the advantages thereof the present invention achieves the target objectives. In particular, no cable tangling occurs after three hours of operation of a cleaning robot provided with a device of this kind.

The invention claimed is:

1. A guiding device for guiding a cable for connecting a submerged robot, to a control and power supply device, said guiding device including:
   a. a coupling including a rotary connector, connected by one side to a first floating portion of the connecting cable extending from the control and power supply device to said coupling and, by the other side, to a second portion of the connecting cable extending from said coupling to the submerged robot; and
   b. a floating support including:
      b(i). a float;
      b(ii). an interface for mechanically connecting the rotary connector to said float; and
      b(iii). a hood extending above a surface of liquid when the floating support is immersed in the liquid and removably connected to the float; and
      in which the mechanical connection between the float and the rotary connector is a ball-and-socket connection.

2. The device as claimed in claim 1, in which the hood is a smooth and convex dome.

3. The device as claimed in claim 1, in which the float is substantially cylindrical, the axis of said cylinder being substantially perpendicular to the flotation plane, the mechanical connection being situated on the axis and on the opposite side to the hood, the float having an increased diameter in the direction of the hood.

4. The device as claimed in claim 3, in which the profile of the float follows a diabolo shape.

5. The device as claimed in claim 1, in which the hood includes a projecting pillar made of a buoyant material.

6. The device as claimed in claim 1, in which the float includes means for removably connecting the hood.

7. The device as claimed in claim 1, including:
   d. a second rotary connector between the float and the first cable portion, said rotary connector allowing one degree of freedom in rotation about an axis perpendicular to the axis of the cylinder.

8. The device as claimed in claim 1, including:
   d. means for increasing the resistance to twisting of the second cable portion.

9. The device as claimed in claim 1, in which the ball-and-socket connection includes a finger that is prevented from rotating relative to the axis of the cylinder.

* * * * *